UNITED STATES PATENT OFFICE.

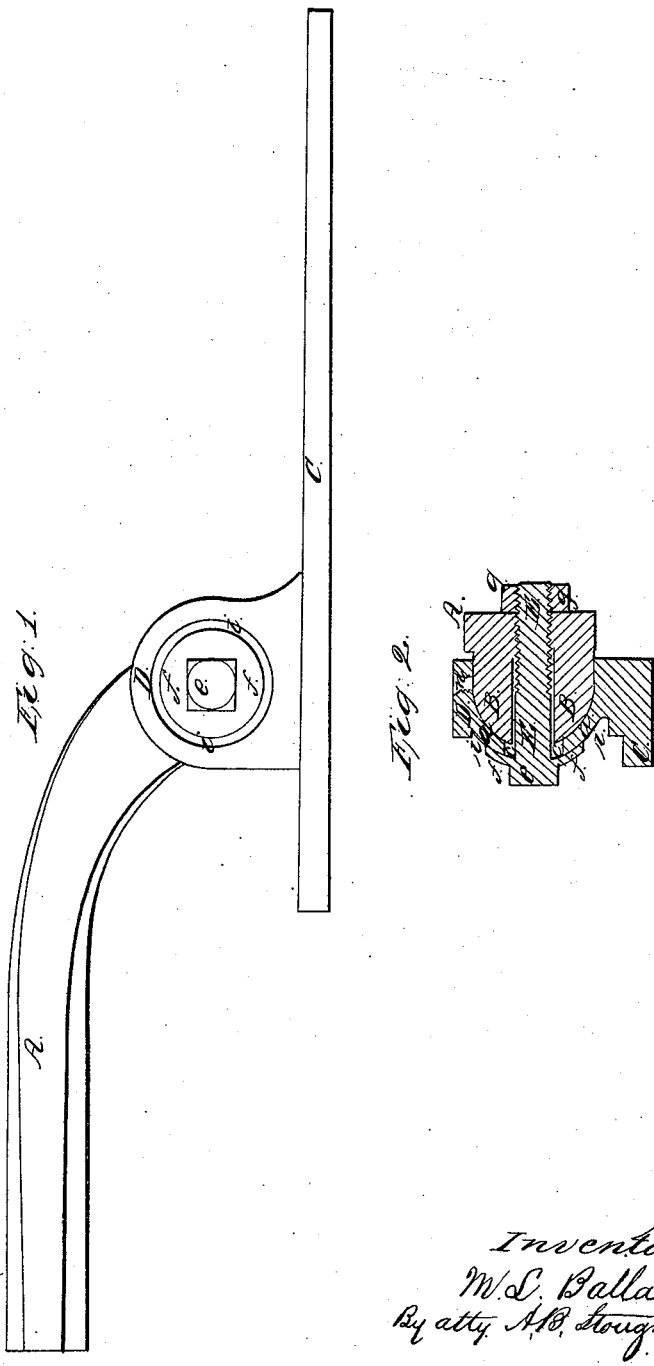
M. L. Ballard,
Pitman Coupling.
Nº 59,310.   Patented Oct. 30, 1866.

M. L. BALLARD, OF CANTON, OHIO, ASSIGNOR TO BALLARD, FAST & CO., OF SAME PLACE.

IMPROVEMENT IN PITMAN-CONNECTIONS.

Specification forming part of Letters Patent No. 59,310, dated October 30, 1866.

*To all whom it may concern:*

Be it known that I, M. L. BALLARD, of Canton, in the county of Stark and State of Ohio, have invented certain new and useful Improvements in Pitman-Connections; and I do hereby declare the following to be a full, clear, and exact description of the same, reference being had to the accompanying drawings, making a part of this specification, in which—

Figure 1 represents a pitman and its connection in elevation. Fig. 2 represents a section through the same.

My invention relates to a convenient manner of making a pitman-connection that will have sufficient play to work freely without noise or cramping, and susceptible of having all the wear or shackle at the joint easily and readily taken up.

To enable others skilled in the art to make and use my invention, I will proceed to describe the same with reference to the drawings.

A represents a connecting-rod, on the end of which is wrought a hemispherical projection, B. C is a bar connected to any part, piece, or machinery that is to be driven by the connecting-rod A, or operated in connection with it, and upon this bar C is wrought a cup or socket that will receive the head B of the connecting-rod A. The side of the bar C opposite to the cup or socket is countersunk, so as to leave a dome-shaped end, $a$, on the head or lug D, formed on the bar C.

Through the head B is made a hole, which is partially threaded to receive the threads on a screw-bolt, E, that passes through it, said bolt also passing through a hole, $c$, in the crown of the dome, that is considerably larger in diameter than the shank of the bolt, so that the joint between the pitman and the bar may freely play and move without being cramped by the screw-bolt. The head $e$ of the screw-bolt is made square or sided, so as to be easily turned by a wrench, and a circular arched flange, $f$, on the bolt fits nicely over the dome $a$, so as to cover the opening or hole $c$ and have a bearing thereon.

The screw-bolt, after it is passed through the two parts and screwed into the pitman-head B, projects far enough through to receive a jam-nut, $g$, to keep it from turning. The screw-bolt, being thus fast in the pitman-head B must move with it, and the arched flange or cap $f$ of the screw can move over the dome $a$, there being provision made, as at $i$, for this purpose.

The joint between the pitman and bar has all the functions of a ball-and-socket joint to the extent of its movement, which extent is regulated by the special application of the device and the extent of movement required, and prevents any cramping, binding, or buckling of the parts, while it is entirely free from noise or clatter. If the joint at any time becomes too loose, a turn or partial turn of the screw-bolt will take up all the slack motion. All the frictional surfaces are spherical or round and concentric, and thus always fit closely without any necessary binding.

$n$ is an oil-hole for lubricating the joint.

Instead of a bolt, I may use a pin and key, or other equivalent fastening.

Having thus fully described my invention, what I claim therein as new, and desire to secure by Letters Patent, is—

A pitman-connection formed by the hemispherical head B, fitting into a similarly-shaped recess, the crown $a$ and its opening $c$, and the flanged screw-bolt E, or its equivalent, a pin, combined to operate in the manner and for the purpose described.

M. L. BALLARD.

Witnesses:
  GEO. W. RAFF,
  C. M. PALMER.